United States Patent [19]

Contant

[11] 4,369,470
[45] Jan. 18, 1983

[54] PLAY-FREE FOCUSING MECHANISM FOR A TELEVISION CAMERA

[75] Inventor: Cornelis J. Contant, Eindhoven, Netherlands

[73] Assignee: U.S. Philips Corporation, New York, N.Y.

[21] Appl. No.: 209,793

[22] Filed: Nov. 24, 1980

[30] Foreign Application Priority Data

Dec. 13, 1979 [NL] Netherlands ............ 7908967

[51] Int. Cl.³ ............................................ H04N 5/26
[52] U.S. Cl. ................................. 358/227; 358/229
[58] Field of Search ................. 358/225, 227, 229; 350/41, 42, 44, 46, 47, 74, 76, 77, 428, 429, 430, 255; 354/195; 352/140

[56] References Cited

U.S. PATENT DOCUMENTS

| 3,055,975 | 9/1962 | Germany et al. | 358/227 |
| 3,573,367 | 4/1971 | Larue, Jr. | 358/227 |
| 3,659,045 | 4/1972 | Siebert | 350/44 |

FOREIGN PATENT DOCUMENTS 1917673 10/1970 Fed. Rep. of Germany.

*Primary Examiner*—Joseph A. Orsino, Jr.
*Attorney, Agent, or Firm*—Marc D. Schechter

[57] ABSTRACT

A television camera comprising a pickup lens and a pickup unit which is aligned with respect to the lens. The pickup unit is arranged in a holder with a slide. The pickup unit is displaceable on the slide along an axis in the direction of the pickup lens by means of an adjusting lever. This lever is resiliently clamped between the pickup unit and a wall of the holder which is directed transverse to the slide. One end of the lever is directly coupled to the transverse wall, while the other end is coupled thereto by way of an adjusting member. When the adjusting member is displaced, the lever is tilted around the point directly coupled to the holder. The center of the lever then moves the pickup unit over the slide. This construction is simple, does not require high manufacturing precision, and its operation is free of play and stickiness.

4 Claims, 5 Drawing Figures

PLAY-FREE FOCUSING MECHANISM FOR A TELEVISION CAMERA

BACKGROUND OF THE INVENTION

The invention relates to a television camera comprising a pickup lens and an elongate pickup unit which is aligned with respect to the lens. The pickup unit includes a pickup tube which is arranged in a holder having a longitudinal axis. The holder also has a slide on which the pickup unit can be displaced along the longitudinal axis in the direction of the pickup lens. An adjusting lever, which is coupled to the pickup unit by way of a part which is situated between the ends of the lever, is provided for displacing the pickup tube along the slide. One end of the lever is directly coupled to the holder at a wall of the holder which extends transversely to the slide. The other end of the lever is coupled to the wall by an adjusting member.

A television camera of the kind described above is disclosed in German Patent No. 19.17.673. The pickup unit in this Patent is arranged in a holder with a slide. The slide radially supports the pickup unit, near the front and rear of the pickup unit, by way of two rigid members and two resilient members. The holder also has a transverse wall through which the front of the pickup unit projects and to which the adjusting lever is coupled. The adjusting lever has a hole midway between its ends. A shaft is journalled in this hole. The shaft is connected to a pin which in turn is coupled to a fork. The fork is mounted on the pickup unit and projects in the lateral direction. Furthermore, one end of the adjusting lever has a fork which engages a shaft connected to the transverse wall. The other end of the adjusting lever has a hole in which there is arranged a shaft. The shaft has a threaded hole directed transverse therethrough.

An adjusting bolt, which is connected to the transverse wall of the holder, is fixed axially and serves as an adjusting member by screwing it into the threaded hole in the shaft. When this bolt is turned, the adjusting lever pivots around the shaft connected to the transverse wall. Because the adjusting lever is coupled to the pickup unit in the described manner, the pickup unit is displaced in the axial direction in the holder. The pickup lens and the pickup unit can thus be adjusted with respect to each other so that a sharp television picture is obtained.

A rather large number of parts are required for adjusting the pick-up unit with respect to the pickup lens in the described television camera. For accurate adjustment; these parts must all be accurately manufactured and accurately mounted in the camera. Therefore, the described television camera is not very well suited for manufacture in large quantities.

It is an other disadvantage of the known camera that the adjusting lever, which can be moved by the adjusting bolt, is coupled to a laterally projecting fork arranged on the pickup unit. Consequently, the adjusting lever not only exerts an axial force on the pickup unit, but also exerts a torque which tends to twist the pickup unit in the holder. If, moreover, the parts are not very accurately manufactured so that they do not fit without play, the movement of the pickup unit in the holder during adjustment may be irregular. In this case, each movement begins with a lurch, making it difficult to properly adjust the pickup unit.

SUMMARY OF THE INVENTION

It is an object of the invention to provide a television camera with relatively few parts and which can be easily and accurately focused. To this end, a television camera according to the invention comprises an adjusting lever which is resiliently clamped between the pickup unit and the transverse wall of the holder and which is coupled to each of these parts by way of two point bearings. The point bearings coupled to the pickup tube are positioned such that the midpoint of a line joining these two point bearings is situated substantially on the longitudinal axis of the pickup tube. The point bearings coupled to the transverse wall are positioned such that these two point bearings are situated substantially within a plane which is perpendicular to and at the midpoint of the line joining the two point bearings coupled to the pickup tube.

For adjusting the pickup unit with respect to the pickup lens, this camera only requires the adjusting lever, the adjusting member and a spring for resiliently clamping the adjusting lever between the pickup unit and the transverse wall of the holder. As a result, the number of parts in the camera according to the invention is substantially reduced. Because the lever is resiliently clamped, it can be simply mounted in the camera and there are no extreme requirements regarding the accuracy of manufacture of the clamped parts. Also, the risk of excess motion during adjustment is extremely small.

Because the adjusting lever acts centrally on the pickup unit, there is no torque produced which could twist the pickup unit in the holder. Also, stickiness and erratic movement during adjustment of the camera is greatly suppressed. The television camera according to the invention is particularly suitable for manufacture in large quantities, and adjustment of the pickup unit with respect to the pickup lens can be easily and extremely accurately performed.

In a preferred embodiment of the television camera according to the invention, the adjusting lever has a central aperture. This aperture is for the passage of light which emerges from the pickup lens in the direction of the pickup unit. Also, the side of the adjusting lever which faces the pickup unit comprises two rounded cams which are pressed against the entrance window of the pickup tube, arranged inside the pickup unit, where they form two point bearings. Because the adjusting lever acts directly on the pickup tube, any axial movement of the pickup tube in the pickup unit will not influence the adjustment of the camera. Movement of this kind may be caused inter alia, by temperature fluctuations occurring when the camera is switched on and off. If temperature fluctuations between the pickup tube and the surrounding parts of the pickup unit occur frequently, the pickup tube is liable to shift inside the pickup unit.

DESCRIPTION OF THE PREFERRED EMBODIMENTS

Figure 1:
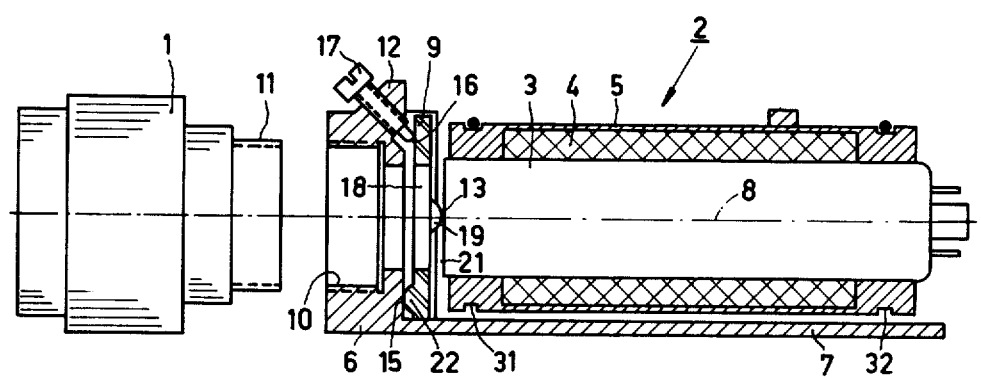
FIG. 1 is a cross-sectional view of a part of a television camera according to the invention.
Figure 2:
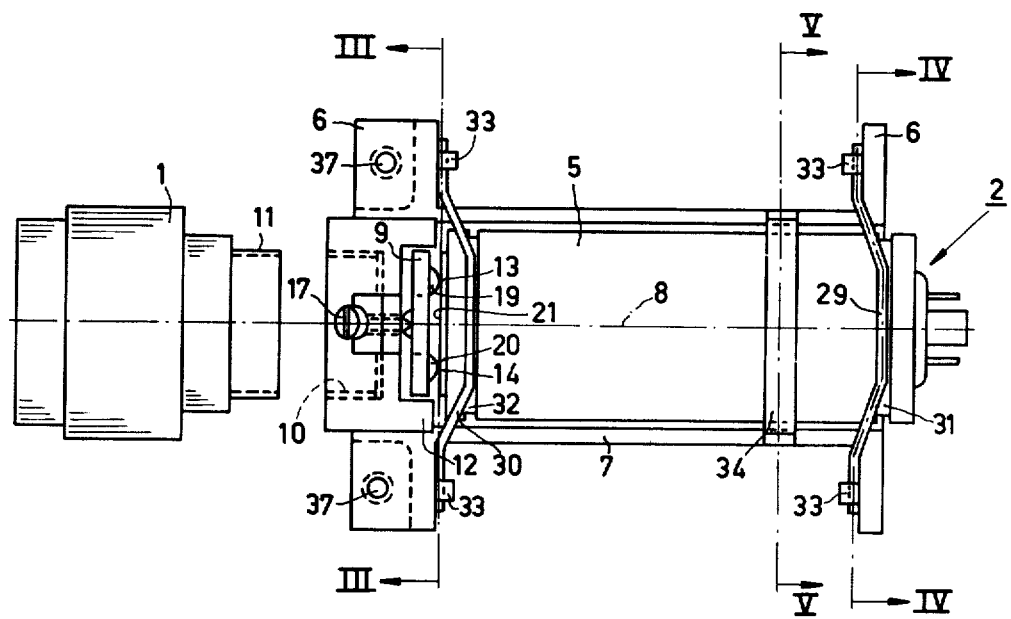
FIG. 2 is a top plan view of the camera shown in FIG. 1.

The FIGS. 1 and 2 show a part of a television camera comprising a pickup lens 1 and an elongate pickup unit 2 which is aligned with respect to lens 1. Pickup unit 2 comprises a pickup tube 3, a coil system 4 and a shielding jacket 5. The pickup unit 2 is arranged in a holder 6 which comprises a slide 7. The pickup unit 2 can be displaced on slide 7 along a longitudinal axis 8 in the direction of the pickup lens 1 by means of an adjusting lever 9.

The drawing shows a very simple one of the many methods of aligning the pickup lens 1 and the pickup unit 2 with respect to each other; in this case, the holder 6 comprises a lens mount 10 in which the pickup lens 1 can be fixed by way of a thread 11. The pickup lens 1 and the holder 6 are shown to be detached for the sake of clarity.

The adjusting lever 9 is clamped, viewed in the direction of the axis 8, between the pickup unit 2 and a transverse wall 12 of the holder 6 which extends transverse to the slide 7. The adjusting lever 9 is coupled to the pickup unit 2 as well as to the transverse wall 12; each coupling is by way of two point bearings. A part of the adjusting lever 9 which is situated between its ends is coupled to the pickup tube 2 by way of the point bearings 13 and 14. One end of the lever 9 is directly coupled to the transverse wall 12 by way of a point bearing 15 while the other end of lever 9 is coupled to wall 12 by a point bearing 16 by way of an adjusting screw 17. When the adjusting screw 17 is turned, the adjusting lever 9 is tilted around the point bearing 15, so that the point bearings 13 (and 14 and hence the pickup unit 2) are displaced in the direction of the axis 8. The pickup lens 1 and the pickup unit 2 can thus be adjusted so that the target of the pickup tube 3 is exactly in the focal plane of the pickup lens 1, so that a sharp television picture is obtained.

The adjusting lever 9 can be very simply mounted in the camera by first screwing the adjusting screw 17 into the holder 6. Then, the adjusting lever 9 is arranged against the transverse wall 12 and the adjusting screw 17. Finally, the pickup unit 2 is placed on slide 7 and is urged against the adjusting lever 9 by a spring (to be described below). Because the adjusting lever 9 is resiliently clamped, there are no excessive requirements regarding the accuracy of manufacture of the transverse wall 12, the adjusting screw 17 and the adjusting lever 9. With tolerances of some tenths of a millimeter, the pickup unit 2 can be adjusted with an accuracy of some tens of micrometers with respect to the pickup lens 1.

Figure 3:
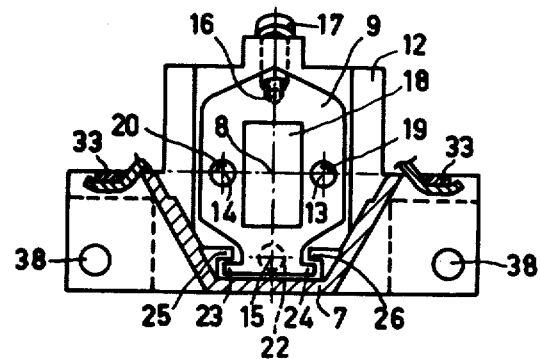
FIG. 3 is a cross-sectional view taken along the line III—III in FIG. 2.

Referring now to FIG. 3, it can be seen that axis 8 intersects the line which connects the bearing points 13 and 14 substantially at the midpoint of this line. Moreover, the point bearings 15 and 16 are substantially on the plane which is perpendicular to and on the midpoint of the line connecting the bearing points 13 and 14. Therefore, the adjusting lever 9 acts centrally on the pickup unit 2 so that there is no twisting of the pickup unit 2 in the holder 6 during adjustment. Lurching or other erratic movement during adjustment of the camera is thus also very small.

The adjusting lever 9 has a central aperture 18 for the passage of light emerging from the pickup lens 1 in the direction of the pickup unit 2. The side of lever 9 which faces the pickup unit 2 comprises two rounded cams 19 and 20. Cams 19 and 20 are pressed against the entrance window 21 of the pickup tube 3 where they form point bearings 13 and 14. Because the adjusting lever 9 acts directly on the pickup tube 3, any movement of the pickup tube 3 in the pickup unit 2 will not influence the adjustment of the camera. Such movements can occur because the pickup unit 2 and the pickup tube 3 often have different temperatures during operation of the camera.

The adjusting lever 9 further comprises a rounded cam 22. Cam 22 is pressed against the transverse wall 12 of the holder 6 where it forms the point bearing 15. Protrusions 23 and 24 on the adjusting lever 9 engage behind projections 25 and 26 on the transverse wall 12 of the holder 6. The normal tolerances between the protrusions and the projections are approximately 0.1 millimeters. They ensure that should the pickup tube 3 become briefly detached from the adjusting lever 9, for example due to a drop or shock, the focusing of the camera does not change when contact is re-established again. The adjusting lever 9 extends substantially parallel to the entrance window 21 of the pickup tube 3, so that displacement of the protrusions 23 and 24 toward the axis 8 over a distance of 0.1 millimeters causes a displacement of the pickup tube 3 in the direction of the axis of at most a few micrometers.

It is to be noted that the drawing shows the adjusting lever 9 and the transverse wall 12 of the holder 6 arranged in front of the pickup tube 3. Nevertheless, it should be clear that the described advantages of the invention are also applicable when the adjusting lever 9 and the transverse wall 12 are arranged behind the pickup tube 3. In that case the adjusting lever 9 need not comprise a central aperture 18. Alternatively, aperture 18 can serve for the passage of electrical connection wires for the pickup tube 3. However, when lever 9 is behind tube 3, it is necessary to align the pickup lens 1 in a different manner with respect to the pickup unit 2.

Figure 4:
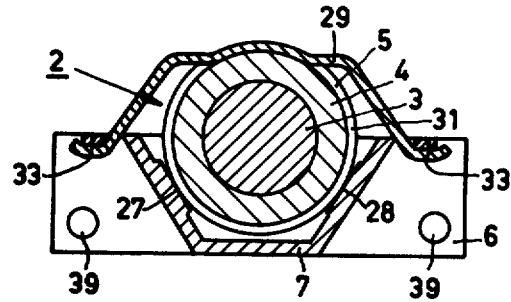
FIG. 4 is a cross-sectional view taken along the line IV—IV in FIG. 2.

Referring again to the embodiment in which lever 9 is in front of tube 3, slide 7 of holder 6 forms, as shown in FIG. 4, a truncated V-shaped groove with walls 27 and 28. The pickup unit 2 is secured in slide 7 by wire springs 29 and 30. These wire springs 29 and 30 fit in grooves 31 and 32 provided in the jacket 5, and are hooked behind lugs 33 on the holder 6. Springs 29 and 30 exert both a radial force which is directed toward the slide 7 as well as to an axial force which acts toward the transverse wall 12 of the holder 6. The pickup unit 2 is thus simply and firmly mounted.

Figure 5:
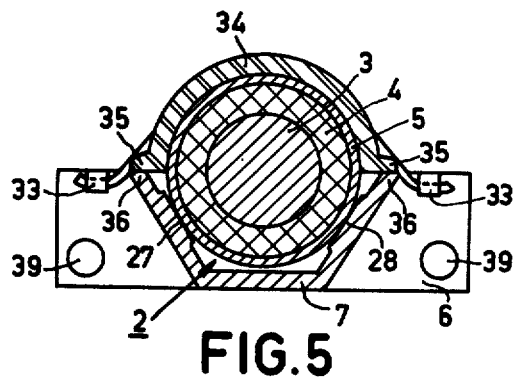
FIG. 5 is a cross-sectional view taken along the line V—V in FIG. 2.

In order to prevent the pickup unit 2 from rotating around its axis 8 during adjustment, a bracket 34 whose ends 35 slide over the edges 36 of the slideway is cemented to the shielding jacket 5 (See FIG. 5.)

The adjusting lever 9 is preferably made of fiberglass-reinforced thermosetting synthetic resin. A lever of this kind retains its shape after prolonged use, while electrical signals in the pickup tube 3 are not influenced by the material.

The holder 6 preferably has holes 37, 38 and 39 on both its ends. The holes 37 are threaded holes. These holes 37, 38 and 39 are available for connecting printed circuit boards and a camera housing (not shown).

What is claimed is:

1. A television camera comprising:
   a pickup lens;
   a pickup unit which is aligned with respect to the pickup lens;

a holder having a slide with a longitudinal axis and having a wall which extends transverse to the longitudinal axis, said pickup unit being arranged on the slide so that it can be displaced along the axis while remaining aligned with the pickup lens;

an adjusting lever, having first and second ends, for adjustably coupling the pickup unit to the wall, said adjusting lever being coupled to the pickup unit at a point between the ends of the lever, said adjusting lever being coupled to the wall at the first and second ends of the lever, the coupling at the second end being by way of an adjusting member;

characterized in that:

the adjusting lever is resiliently clamped between the pickup unit and the wall;

the adjusting lever is coupled to the pickup unit at two points by a first pair of point bearings, said first pair of point bearings being situated such that the longitudinal axis intersects a line connecting these bearings substantially at the midpoint of the line; and the adjusting lever is coupled to the wall by a second pair of point bearings, said second pair of point bearings being situated in a plane which is substantially perpendicular to and at the midpoint of the line which connects the first pair of point bearings.

2. A televison camera as claimed in claim 1, characterized in that:

the adjusting lever has a central aperture through which light from the pickup lens can pass to reach the pickup unit;

the pickup unit comprises a pickup tube having an entrance window; and the adjusting lever has two rounded cams which contact the entrance window to form the first pair of point bearings.

3. A television camera as claimed in claim 1 or 2, characterized in that:

the slide forms a V-shaped groove; and the pickup unit is secured on the slide by a wire spring which forces the pickup unit radially into the slide as well as axially toward the wall.

4. A television camera as claimed in claim 3, characterized in that:

the adjusting lever is made of a fiberglass-reinforced thermosetting synthetic resin.

* * * * *